June 4, 1940.    G. A. PARTRIDGE    2,202,815
GROUND LEVELER
Filed Dec. 30, 1938    2 Sheets-Sheet 1
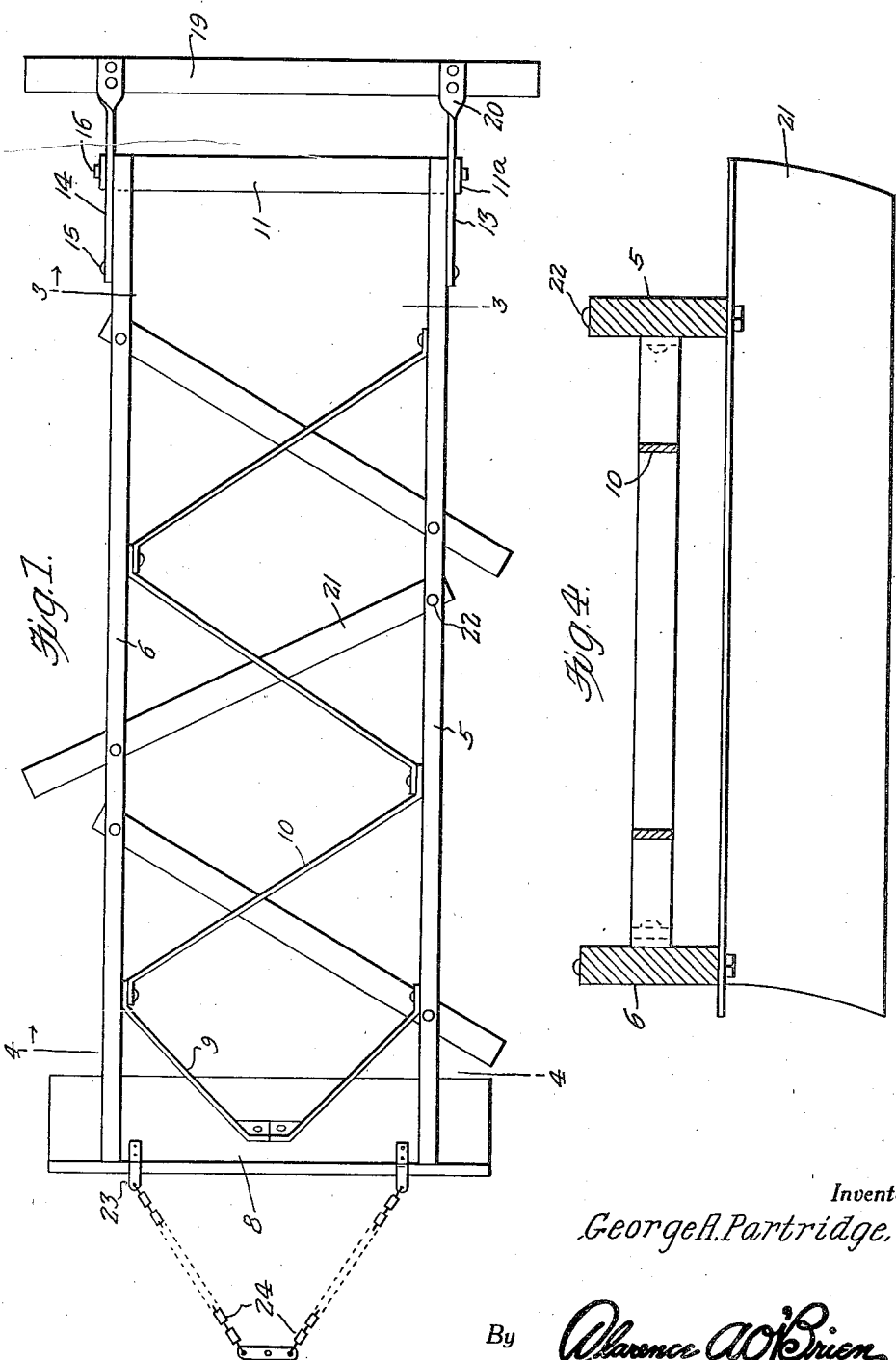
Inventor
George A. Partridge,
By Clarence A. O'Brien
and Hyman Berman
Attorneys June 4, 1940.  G. A. PARTRIDGE  2,202,815
GROUND LEVELER
Filed Dec. 30, 1938  2 Sheets-Sheet 2
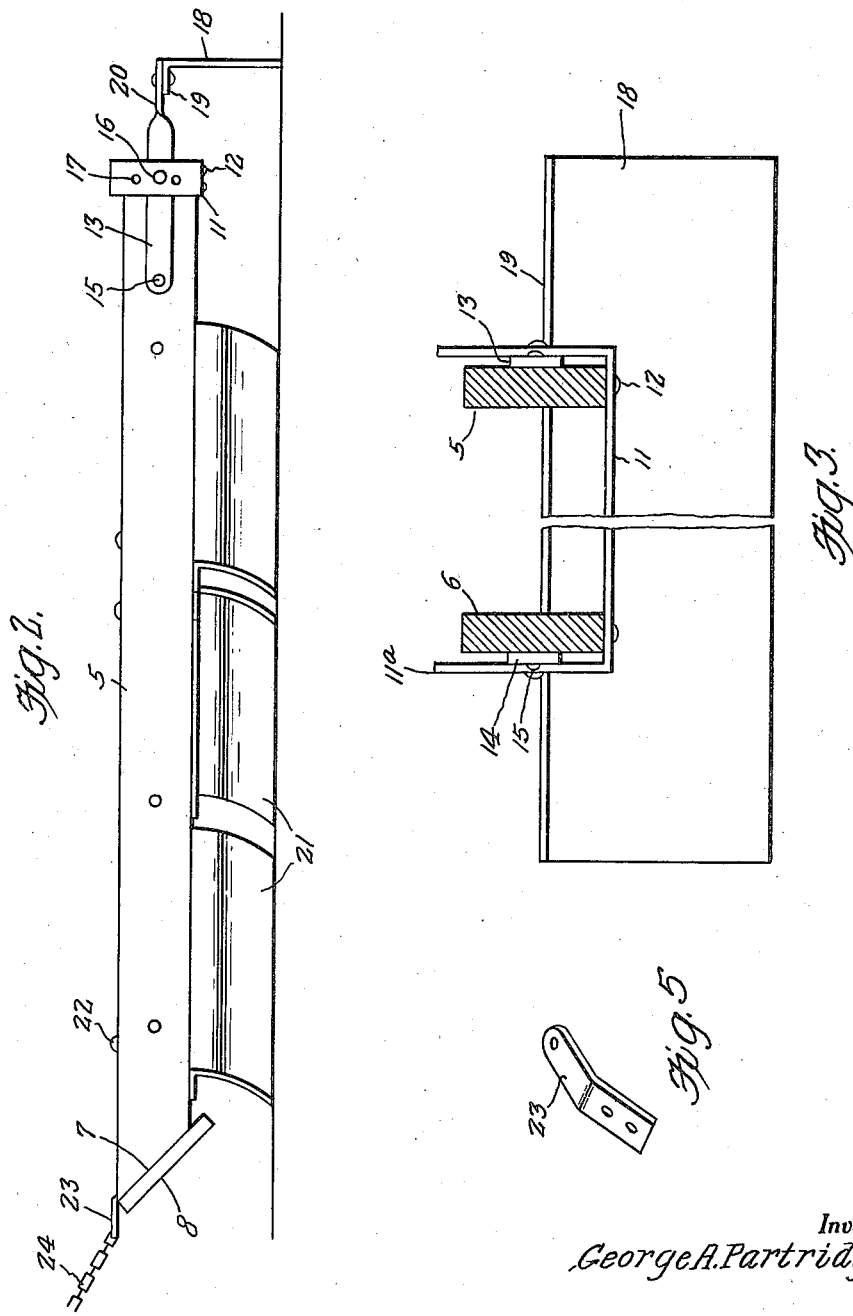
Inventor
George A. Partridge.
By Clarence A. O'Brien
and Hyman Berman
Attorneys Patented June 4, 1940

2,202,815

UNITED STATES PATENT OFFICE 2,202,815

GROUND LEVELER

George A. Partridge, Paradise, Calif.

Application December 30, 1938, Serial No. 248,572

2 Claims. (Cl. 37—179)

This invention appertains to new and useful improvements in means for leveling ground.

The principal object of the present invention is to provide a ground leveler which will serve to level a wide area of ground in one sweep without requiring a return over the same ground.

Another important object of the invention is to provide a ground leveling apparatus which is substantially incapable of becoming clogged up.

Other objects and advantages of the invention will become apparent to the reader of the following specification.

In the drawings:

Figure 1 represents a top plan view.

Figure 2 is a side elevation.

Figure 3 is a section on the line 3—3 of Figure 1.

Figure 4 is a section on the line 4—4 of Figure 1.

Figure 5 is a perspective view of one of the draft line connecting lugs.

Referring to the drawings wherein like numerals designate like parts, it can be seen that the apparatus comprises two side boards 5 and 6, the forward ends of which are cut off obliquely being undercut as at 7, and have the underlying float board 8 secured thereto. The float board assumes the angular position shown in Figure 2 to float or ride over hills of earth.

Brace members 9 extend from the top side of the float board 8 and connect to the side boards 6 and 5, while additional brace bars 10 extend back and forth between the side boards 5 and 6 to further brace the side boards.

At the remaining ends of the side boards 5 and 6 is the U-shaped strap 11, the leg portions of which extend upwardly across the rear end portions of the side boards 5 and 6. The lower portion of this U-shaped strap 11 is secured to the side boards 5 and 6 by screws or the like 12. The legs as shown in Figure 3, are closely spaced from the outer surfaces of the side boards 5 and 6 to provide slide-ways for the arms 13 and 14. These arms, each at one end pivotally secured as at 15 to the outer side of the corresponding side boards 5 and 6, extend between the legs 11a of the U-shaped member 11 and the side boards 5 and 6 and are secured in definite position by disposing a pin, screw or the like 16 through one of the openings 17 in the U-shaped structure 11.

Numeral 18 represents the rear float board which is vertically disposed and flanged at its upper end as at 19 for attachment to the rear end 20 of the arms 13 and 14.

Transversely arcuate blades 21 are disposed in zigzagged relation under the boards 5 and 6, these blades being flanged at their upper ends and attached by these flanges to the side boards by bolts or the like 22.

These blades are arranged in zigzagged relation under the boards and each blade has one end portion protruding beyond one side of the apparatus.

Angularly shaped attaching lugs 23—23 are attached to the front float board 8 and to these can be connected the draft chains 24.

While the foregoing specification sets forth the invention in specific terms, it is to be understood that numerous changes in the shape, size and material may be resorted to without departing from the spirit and scope of the invention as claimed hereinafter.

Having described the invention, what is claimed as new is—

1. A ground leveler comprising a frame including a pair of side members, leveling blades secured to the side members at the bottom portions thereof and bridging the said side members, a pair of swingable arms at the rear ends of the side members, and a rear float board carried by the said arms, and a U-shaped frame embracing the rear portions of the side members and having its lower portion secured to the under portions of the said side members, said U-shaped frame having its leg portions disposed upwardly in spaced relation to the side members to define guideways for the arms.

2. A ground leveler comprising a frame including a pair of side members, leveling blades secured to the side members at the bottom portions thereof and bridging the said side members, a pair of swingable arms at the rear ends of the side members, and a rear float board carried by the said arms, and a U-shaped frame embracing the rear portions of the side members and having its lower portion secured to the under portions of the said side members, said U-shaped frame having its leg portions disposed upwardly in spaced relation to the side members to define guideways for the arms, and detent means between the leg portions of the frame and the side members for holding the arms in definite adjusted position.

GEORGE A. PARTRIDGE.